United States Patent

Thomas

[15] 3,673,336

[45] June 27, 1972

[54] TIME DIVISION MULTIPLEX SWITCHES

[72] Inventor: David Michael Thomas, Bayshore, Ottawa, Canada

[73] Assignee: International Standard Electric Corporation, New York, N.Y.

[22] Filed: Oct. 12, 1970

[21] Appl. No.: 79,728

[30] Foreign Application Priority Data

Oct. 21, 1969 Great Britain ....................51,628/69

[52] U.S. Cl. ....................................179/15 BD, 179/15 A

[51] Int. Cl. ....................................................H04j 3/08

[58] Field of Search ...............................179/15 BD, 15 A

[56] References Cited

UNITED STATES PATENTS 3,165,588 1/1965 Holzer ...............................179/15 BD

*Primary Examiner*—Ralph D. Blakeslee

*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

A time division multiplex (TDM) switch is provided which serves a number of highways. Individual subscriber loops are connectd to the TDM switch in place of some of the TDM channels on the highways. This enables the ratio of TDM channels to individual loops to be altered conveniently.

3 Claims, 3 Drawing Figures

Inventor
David Michael Thomas
By J. B. Warner
Attorney

TIME DIVISION MULTIPLEX SWITCHES

This invention relates to automatic telecommunication systems, and especially to such systems in which messages are conveyed in time division multiplex manner.

According to the present invention there is provided an automatic telecommunication exchange, in which communication connections are set up in a time division multiplex (TDM) manner. At least one TDM highway is provided for signals incoming to the exchange and message storage means are provided for each such TDM highway. Each message storage means includes a storage portion individual to each time division channel on its highway and each highway is connected to some at least of its associated storage portions by manually disconnectable means. The exchange serves at least one individual subscriber's line which is accommodated by connecting it via manually disconnectable means to one of said storage portions instead of connecting that storage portion to said incoming TDM highway or one of said TDM highways. Intelligence from a subscriber's line is applied to its storage portion after it has been converted into TDM form; its time position in a TDM cycle being the time position for the storage portion to which that line is connected. Switching means are provided to connect said message storage means to out-going TDM highways to provide for cross-exchange switching.

Figure 1:
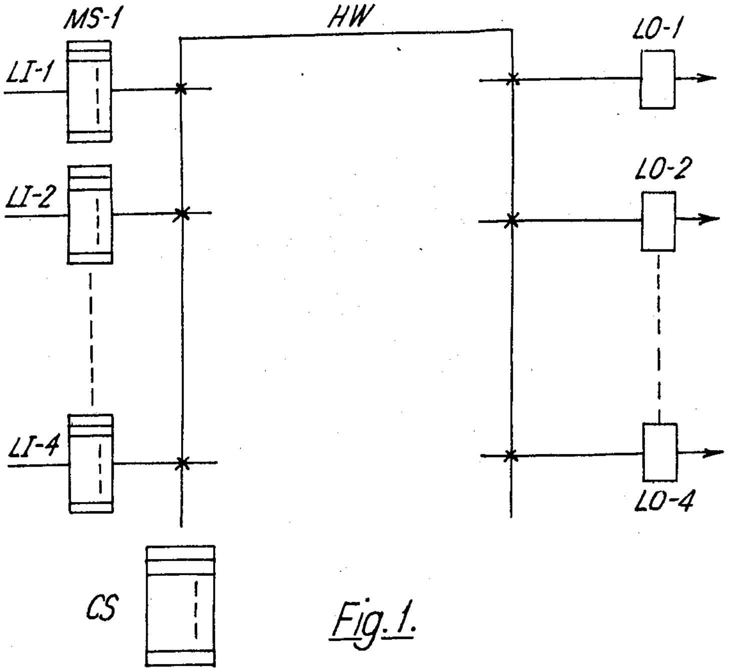
Figure 3:
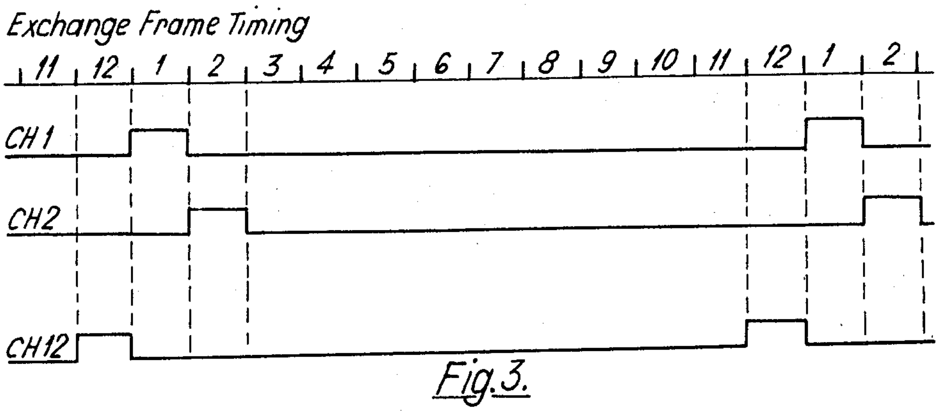
Figure 2:
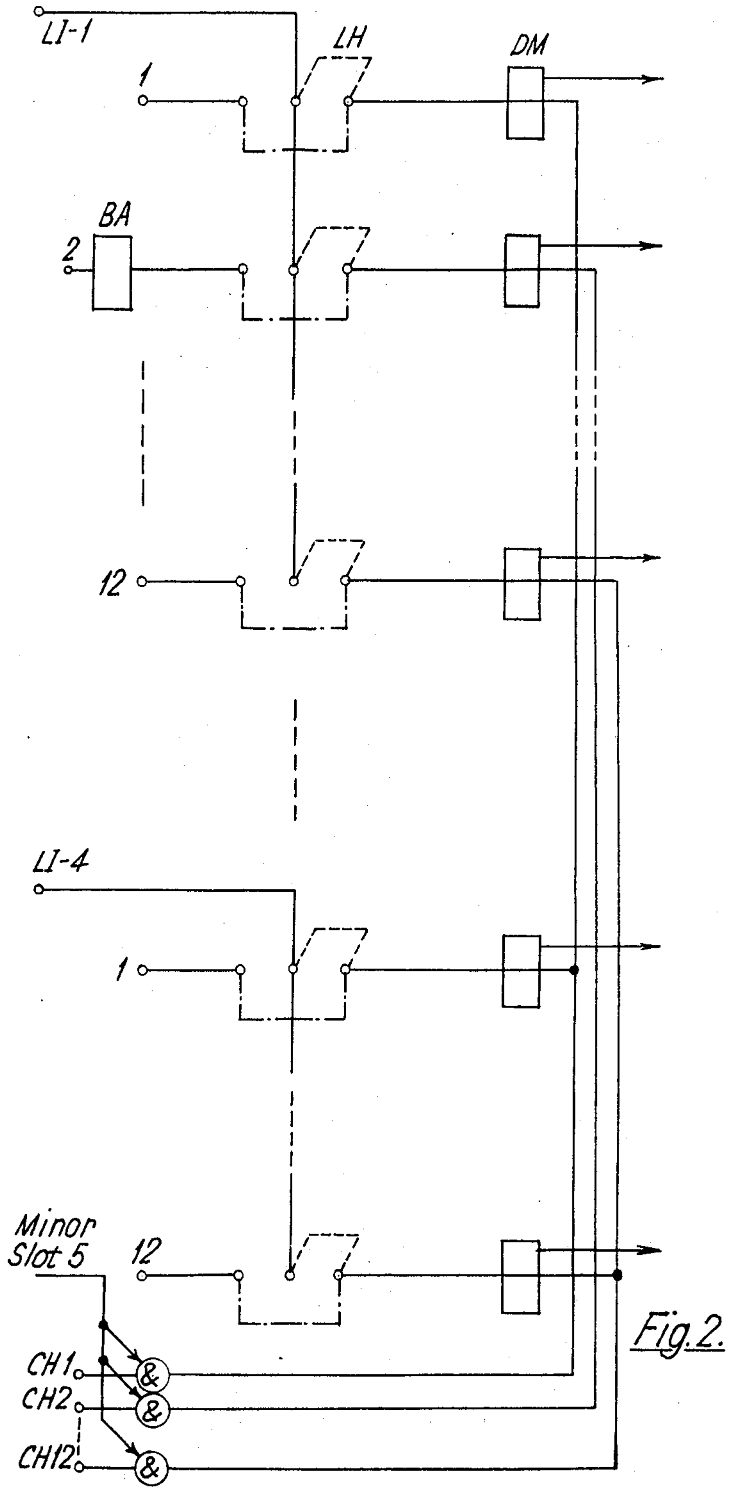

An embodiment of the invention will now be described with reference to the accompanying drawings, in which FIG. 1 is a schematic representation of a single highway TDM switch exchange to which the invention may be applied, FIG. 2 shows schematically an arrangement according to the invention, and FIG. 3 shows certain waveforms which are useful in explaining the operation of the system.

In FIG. 1, the TDM switch serves a set of incoming multiplex highways LI–1, LI–2 . . . LI–4 and a set of outgoing multiplex highways LO–1, LO–2, . . . LO–4, all of which are assumed to be identical. These highways are interconnectable over a common highway HW, to which they can be connected by gating means, shown by crosses, which are normally closed.

Each incoming highway is served by a message store such as MS1 for the highway LI–1, each such store having a unique storage element for each time division channel on its highway. The incoming highways are also served by a connection store CS, which has a storage section for each time position at which an outgoing highway can be connected to the common highway HW. For every time position there is a single time slot, so that with four outgoing highways and 12 channels per outgoing highway there are 48 time slots. With four outgoing highways, the channel period is divided into five slots, known as minor slots. Of the minor slots within each channel period, the fifth is used for writing into the message stores such as MS1. The gate between HW and LOI is opened at minor slot 1, that between HW and LO2 at minor slot 2, and so on.

It is assumed that the TDM system uses "Delta-Sigma" modulation, where the pulse is 0 or 1, depending on how the sampled amplitude compares with previous samples, so that at each channel time only one pusle arrives. When such a message bit arrives it is written into its portion of the message store for its highway the address of the message store portion into which it goes being placed in a section of CS when the call is set up. CS is read cyclically and when a row with an address is read, the gate between the message store portion to which the address corresponds and the highway is opened. Thus the bit is gated to the appropriate outgoing highway because the gates between each such highway and HW are opened at the appropriate slot times, this gating being independent of the cross-exchange connections being set up.

Thus it will be seen that in such an arrangement incoming frame aligned groups of channels pulses are "demultiplexed and stored" in the staticizers formed by the message stores prior to being switched across the exchange. By suitably organizing the equipment these two operations can be performed simultaneously, and as will be seen later, this organization allows individual local loops terminating at the switch to be accommodated by a simple strap after some form of bit alignment that will compensate for propagation delay around the subscriber's loop.

In FIG. 2 equipment is shown for handling both 12-channel multiplexed groups (bit multiplexed) arriving at a switch such as that of FIG. 1, the groups being frame aligned with the exchange timing, and individual subscriber's loops, each arriving at the switch from a bit aligner. One of these bit aligners is indicated at BA. In this example the channel equipment module can handle four highways or up to a maximum of 48 local loops. Two groups only are shown for simplicity. By clocking the D-type bistables such as DM which form the individual portions of the message stores as shown in FIG. 2, the groups of pulses on the highways are demultiplexed and staticized at the same time (see timing diagram in FIG. 3). By replacing the straps such as LH on a trunk group with 12 local straps such as LS as shown in FIG. 1, 12 local loops can be handled. These loops will enter the channel equipment from bit aligners such as BA, which deliver the pulses in a non-return to zero form, aligned such that transitions do not take place at minor slot five. The exact phase of the pulse with respect to exchange timing does not matter provided that it remains constant and the channel can be strapped straight into the message store bistable input as shown in FIG. 2.

The strapping is flexible enough to allow one channel equipment module to terminate any number of highways up to a maximum of four, together with an appropriate number of local loops For example, the module could handle four highway groups and no local loops, or three highway groups and 12 loops, or two trunk groups and 24 loops, etc.

Although the above arrangement has been described on the assumption that Delta-Sigma modulation is used, the invention is equally applicable to an exchange using other modulation techniques, such as pulse code modulation or pulse amplitude modulation. In such case it will be clear that the storage arrangements and possibly also the highway arrangements will differ from what is shown in the accompanying drawings. Again, the invention can also be used where there are two or more cross-office highways, and/or where the TDM connections are switched via two or more stages of "space" switching.

It is to be understood that the foregoing description of specific examples of this invention is made by way of example only and is not to be considered as a limitation on its scope.

I claim:

1. An automatic telecommunication exchange in which communication connections are set up in time division multiplex (TDM) manner, comprising an exchange serving at least one individual subscriber's lines, a plurality of TDM highways incoming to the exchange, a plurality of message storage means, one coupled to each of said incoming TDM highways, each of said message storage means including a storage portion individual to each time division channel on its associated incoming highway, each of said incoming highways including connections to a plurality of its associated storage portions by manually disconnectable means, a line accommodated by connection via manually disconnectable means to one of said plurality of associated storage portions, said manually disconnectable means including connections for connecting said one associated storage portion to one of said incoming TDM highways, means applying intelligence from a subscriber's line to its associated storage means where it is simultaneously demultiplexed and stored and where its time position in a TDM cycle is the time position for the storage position to which that line is connected, and switching means provided to connect said message storage means to one of a plurality of outgoing TDM highways to provide for cross-exchange switching.

2. An exchange as claimed in claim 1, in which the exchange has capacity for two or more incoming highways and in which at least one such incoming highway's channels are used solely for said local lines.

3. An exchange as claimed in claim 1, in which intelligence is conveyed on the TDM highways by "Delta-Sigma" modulation, and in which each said message store portion consists of a single D-type bistable which is clock pulse controlled.

* * * * *